(12) United States Patent
Wang et al.

(10) Patent No.: US 11,852,465 B2
(45) Date of Patent: Dec. 26, 2023

(54) WAFER INSPECTION METHOD AND APPARATUS THEREOF

(71) Applicant: GlobalWafers Co., Ltd., Hsinchu (TW)

(72) Inventors: Shang-Chi Wang, Hsinchu (TW); Miao-Pei Chen, Hsinchu (TW); Han-Zong Wu, Hsinchu (TW); Chia-Chi Tsai, Hsinchu (TW); I-Ching Li, Hsinchu (TW)

(73) Assignee: GlobalWafers Co., Ltd., Hsinchu (TW)

( * ) Notice: Subject to any disclaimer, the term of this patent is extended or adjusted under 35 U.S.C. 154(b) by 15 days.

(21) Appl. No.: 17/585,552

(22) Filed: Jan. 27, 2022

(65) Prior Publication Data

US 2022/0316872 A1  Oct. 6, 2022

(30) Foreign Application Priority Data

Apr. 1, 2021 (TW) ................. 110112054

(51) Int. Cl.
*G01B 11/30* (2006.01)
*G01N 21/95* (2006.01)
*G01N 21/93* (2006.01)

(52) U.S. Cl.
CPC .......... *G01B 11/303* (2013.01); *G01N 21/93* (2013.01); *G01N 21/9501* (2013.01)

(58) Field of Classification Search
CPC .. G01B 11/303; G01N 21/93; G01N 21/9501; G01N 2021/8887; G01N 21/01; G01N 21/8851
See application file for complete search history.

(56) References Cited

U.S. PATENT DOCUMENTS

| 8,761,488 | B2 | 6/2014 | Kamiyama et al. | |
|---|---|---|---|---|
| 8,831,899 | B2 | 9/2014 | Nemoto et al. | |
| 2006/0181700 | A1* | 8/2006 | Andrews | G01N 21/4738 356/237.2 |
| 2009/0073440 | A1* | 3/2009 | Tiemeyer | G01N 21/9501 702/58 |
| 2011/0194753 | A1* | 8/2011 | Kamiyama | G01N 21/8851 382/149 |
| 2012/0050729 | A1* | 3/2012 | Mitomo | G01N 21/956 356/237.1 |
| 2013/0258351 | A1* | 10/2013 | Miyoshi | G01B 11/303 356/600 |
| 2018/0328859 | A1* | 11/2018 | Osada | G01N 21/6489 |

* cited by examiner

*Primary Examiner* — Tarifur R Chowdhury
*Assistant Examiner* — Akbar Hassan Rizvi
(74) *Attorney, Agent, or Firm* — JCIPRNET

(57) ABSTRACT

The disclosure provides a wafer inspection method and wafer inspection apparatus. The method includes: receive scanning information of at least one wafer, wherein the scanning information includes a plurality of haze values; the scanning information is divided into a plurality of information blocks according to the unit block, and the feature value of each of the plurality of information blocks is calculated according to the plurality of haze values included in each of the plurality of information blocks; and converting the feature value into a color value according to the haze upper threshold and the haze lower threshold, generating the color value corresponding to the at least one wafer according to the converted color value according to the feature value, whereby the color graph displays the texture content of the at least one wafer.

8 Claims, 6 Drawing Sheets

WAFER INSPECTION METHOD AND APPARATUS THEREOF

CROSS-REFERENCE TO RELATED APPLICATION

This application claims the priority benefit of Taiwan application serial no. 110112054, filed on Apr. 1, 2021. The entirety of the above-mentioned patent application is hereby incorporated by reference herein and made a part of this specification.

BACKGROUND

Technical Field

The disclosure relates to a defect inspection technology of a semiconductor wafer, and more particularly to a wafer inspection method and a wafer inspection apparatus.

Description of Related Art

Before shipment from a factory, an electronic device to be tested has generally undergone visual inspection by a visual inspector in charge for determination by criteria such as whether an electronic device produced is defective or whether an electronic device is flat. For example, in determining flatness of a silicon carbide (SiC) wafer, a haze image of the silicon carbide wafer is usually obtained through automated optical inspection (AOI) equipment, and then the haze image is manually determined by human eyes.

However, there is no consistent standard in determination of visual inspection for the visual inspector to follow. Therefore, erroneous determination is often caused due to subjective determination by the visual inspector. Thus, how to avoid overly subjective inspection results due to excessive reliance on inspection by human eyes is indeed an issue of concern to people skilled in the art.

SUMMARY

The disclosure provides a wafer inspection method and a wafer inspection apparatus, which may convert wafer scanning information to a color image to improve accuracy and efficiency of wafer defect determination.

An embodiment of the disclosure provides a wafer inspection method, adapted for an electronic apparatus including a processor. The method includes the following steps. Scanning information of at least one wafer is received, and the scanning information includes multiple haze values. The scanning information is divided into multiple information blocks according to a unit block, and a feature value of each of the information blocks is calculated according to the haze values included in each of the information blocks. The feature value is converted to a color value according to a haze upper threshold and a haze lower threshold. A color image corresponding to the at least one wafer is generated according to the color value converted from the feature value, and the color image illustrates a texture of the at least one wafer.

In an exemplary embodiment of the disclosure, the feature value includes at least one of a mean, a standard deviation, and a coefficient of variation.

In an exemplary embodiment of the disclosure, in a single-wafer defect test mode, a maximum value of the feature value is set to the haze upper threshold, and a minimum value of the feature value is set to the haze lower threshold.

In an exemplary embodiment of the disclosure, in a same batch process test mode and a multi-batch process test mode, the haze upper threshold is set according to a default upper threshold, and the haze lower threshold is set according to a default lower threshold.

In an exemplary embodiment of the disclosure, the method further includes the following steps. The information blocks of which the feature value is greater than the haze upper threshold and less than the haze lower threshold are marked. A quantity of excess of the feature value in the at least one wafer is calculated according to a quantity of marks. The information blocks of which the feature value is not greater than the haze upper threshold and is within a difference value from the haze upper threshold, as well as the information blocks of which the feature value is not less than the haze lower threshold and is within the difference value from the haze lower threshold are marked. A quantity of approximate excess of the feature value in the at least one wafer is calculated according to a quantity of marks.

In an exemplary embodiment of the disclosure, the method further includes the following steps. Process analysis is performed on a process to which the at least one wafer belongs according to the quantity of excess and the quantity of approximate excess. A process parameter is determined according to an analysis result of the process analysis.

In an exemplary embodiment of the disclosure, the step of converting the feature value to the color value according to the haze upper threshold and the haze lower threshold further includes the following steps. A value range between the haze upper threshold and the haze lower threshold is separated equidistantly according to a set value to generate multiple sub-haze values. The sub-haze values are set to correspond to the color value respectively. According to the sub-haze values corresponding to the feature value, the feature value is converted to a corresponding color value.

An embodiment of the disclosure provides a wafer inspection apparatus, including a connecting apparatus, a storage apparatus, and a processor. The connecting apparatus is for connecting a scanning apparatus to receive scanning information of at least one wafer scanned and generated by the scanning apparatus, and the scanning information includes multiple haze values. The storage apparatus stores one or more instructions. The processor is coupled to the connecting apparatus and the storage apparatus, and is configured to execute the instruction for the following operation. The scanning information is received. The scanning information is divided into multiple information blocks according to a unit block, and a feature value of each of the information blocks is calculated according to the haze values included in each of the information blocks. The feature value is converted to a color value according to a haze upper threshold and a haze lower threshold. A color image corresponding to the at least one wafer is generated according to the color value converted from the feature value, and the color image illustrates a texture of the at least one wafer.

In an exemplary embodiment of the disclosure, the feature value includes at least one of a mean, a standard deviation, and a coefficient of variation.

In an exemplary embodiment of the disclosure, in a single-wafer defect test mode, the processor is configured to set a maximum value of the feature value to the haze upper threshold and set a minimum value of the feature value to the haze lower threshold.

In an exemplary embodiment of the disclosure, in a same batch process test mode and a multi-batch process test mode, the processor is configured to set the haze upper threshold according to a default upper threshold and set the haze lower threshold according to a default lower threshold.

In an exemplary embodiment of the disclosure, the processor is further configured to perform the following operation. The information blocks of which the feature value is greater than the haze upper threshold and less than the haze lower threshold are marked. A quantity of excess of the feature value in the at least one wafer is calculated according to a quantity of marks. The information blocks of which the feature value is not greater than the haze upper threshold and is within a difference value from the haze upper threshold, as well as the information blocks of which the feature value is not less than the haze lower threshold and is within the difference value from the haze lower threshold are marked. A quantity of approximate excess of the feature value in the at least one wafer is calculated according to a quantity of marks.

In an exemplary embodiment of the disclosure, the processor is further configured to perform the following operation. Process analysis is performed on a process to which the at least one wafer belongs according to the quantity of excess and the quantity of approximate excess. A process parameter is determined according to an analysis result of the process analysis.

In an exemplary embodiment of the disclosure, in the operation of converting the feature value to the color value according to the haze upper threshold and the haze lower threshold, the processor is further configured to perform the following operation. A value range between the haze upper threshold and the haze lower threshold is separated equidistantly according to a set value to generate multiple sub-haze values. The sub-haze values are set to correspond to the color value respectively. According to the sub-haze values corresponding to the feature value, the feature value is converted to a corresponding color value.

In order to make the aforementioned features and advantages of the disclosure comprehensible, embodiments accompanied with drawings are described in detail below.

DESCRIPTION OF THE EMBODIMENTS

Figure 1:
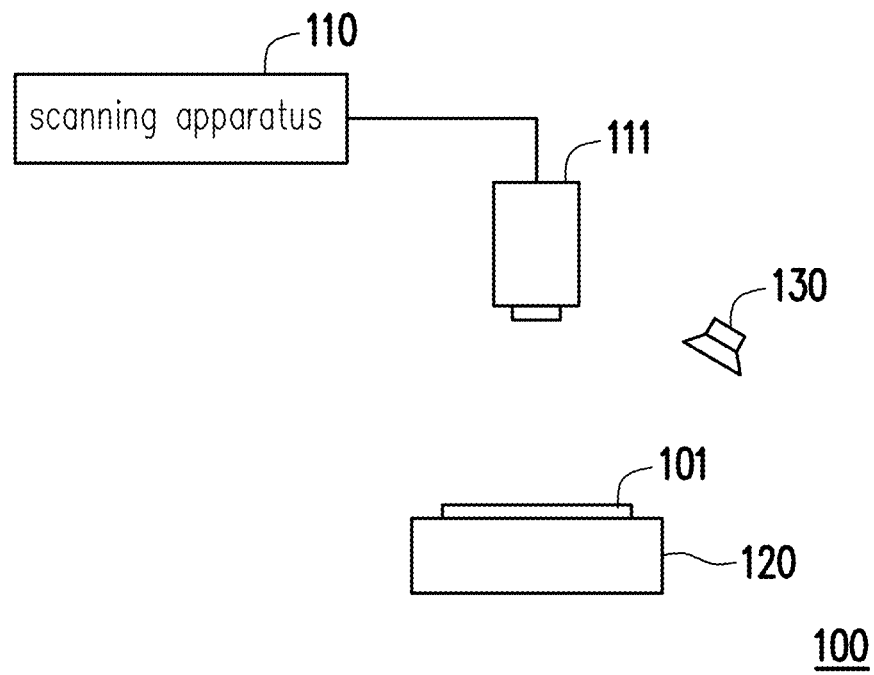
FIG. 1 is a schematic diagram of a wafer scanning system according to an embodiment of the disclosure.

FIG. 1 is a schematic diagram of a wafer scanning system according to an embodiment of the disclosure. With reference to FIG. 1, a wafer scanning system 100 may be applied to automated optical inspection equipment for scanning an object, such as a semiconductor chip, a wafer, a circuit board, a panel, or the like. In other words, the wafer scanning system 100 may be used to scan the surface of the object for scanning information of the surface of the object.

The wafer scanning system 100 may include a scanning apparatus 110, a transfer apparatus 120, and a light source apparatus 130. The scanning apparatus 110 has an optical lens 111. In an embodiment, the scanning apparatus 110 may send a control signal in a wired or wireless manner to control at least one of the optical lens 111, the transfer apparatus 120, and the light source apparatus 130. The optical lens 111 may employ an area scan camera and/or a line scan camera. The line scan camera is relatively often used in dynamic scanning inspection to shoot while an object 101 is moving, thereby ensuring continuity of an inspection process. The transfer apparatus 120 is used to implement fully automated inspection. For example, the transfer apparatus 120 may transfer the object 101 to an inspection region and scan through the optical lens 111 disposed on a side of the inspection region to obtain information of the object 101 and perform subsequent analysis.

In different embodiments, the wafer scanning system 100 may employ various wafer scanning systems, such as an optical microscope system, a scanning electron microscope (SEM) system, a focused ion beam (FIB) microscope system, a laser microscope system, a transmission electron microscope (TEM) system, a scanning probe microscope (SPM) system, or other suitable optical image systems. Accordingly, when a different wafer scanning system is employed, scanning information that the wafer scanning system 100 may obtain by scanning the surface of an object includes, for example but not limited to, a haze value, surface roughness (Ra), a luminance value, a contrast value, an RGB color tone value, a saturation value, a color temperature value, a Gamma value, and other parameters.

The light source apparatus 130 is used to provide a light source to support illumination for the object 101. The type of the light source apparatus 130 is, for example but not limited to, a parallel light lamp, a diffused light lamp, a dome-shaped lamp, or the like. The light source apparatus 130 may emit various types of light such as white light, red light, green light, blue light, ultraviolet light, and infrared light. In addition, the type of the light source apparatus 130 may be changed in correspondence with different types of the object 101. It should be noted that the disclosure does not limit the number of the scanning apparatus 110, the transfer apparatus 120, and the light source apparatus 130.

Figure 2:
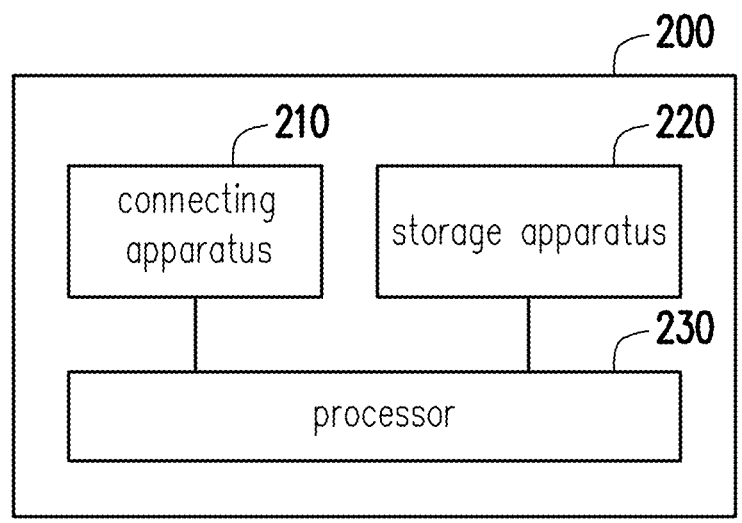
FIG. 2 is a schematic diagram of a wafer inspection apparatus according to an embodiment of the disclosure.

FIG. 2 is a schematic diagram of a wafer inspection apparatus according to an embodiment of the disclosure. With reference to FIG. 2, a wafer inspection apparatus 200 includes, but is not limited to, a connecting apparatus 210, a storage apparatus 220, and a processor 230. The wafer inspection apparatus 200 may be any electronic apparatus with computing capabilities such as a personal computer, a notebook computer, a server, or the like, but the disclosure is not limited thereto. The connecting apparatus 210 is used to connect the scanning apparatus 110 in a wired or wireless manner for receiving scanning information generated by the scanning apparatus 100 scanning a wafer.

The storage apparatus 220 may include a volatile storage medium and/or a non-volatile storage medium and may be used to store data. For example, the volatile storage medium may be random access memory (RAM), and the non-volatile storage medium may be read-only memory (ROM), solid state drive (SSD), traditional hard disk drive (HDD), other similar apparatuses, or a combination of these apparatuses for storing one or more instructions executed by the processor 230.

The processor 230 is coupled to the connecting apparatus 210 and the storage apparatus 220 and may access and execute an instruction recorded in the storage apparatus 220 to implement the wafer inspection method in the embodiments of the disclosure. In different embodiments, the processor 230 is, for example but not limited to, a central processing unit (CPU) or other programmable general-purpose or special-purpose microprocessor, a digital signal processor (DSP), a programmable controller, an application specific integrated circuit (ASIC), a programmable logic device (PLD), other similar apparatuses, or a combination of these apparatuses.

Figure 3:
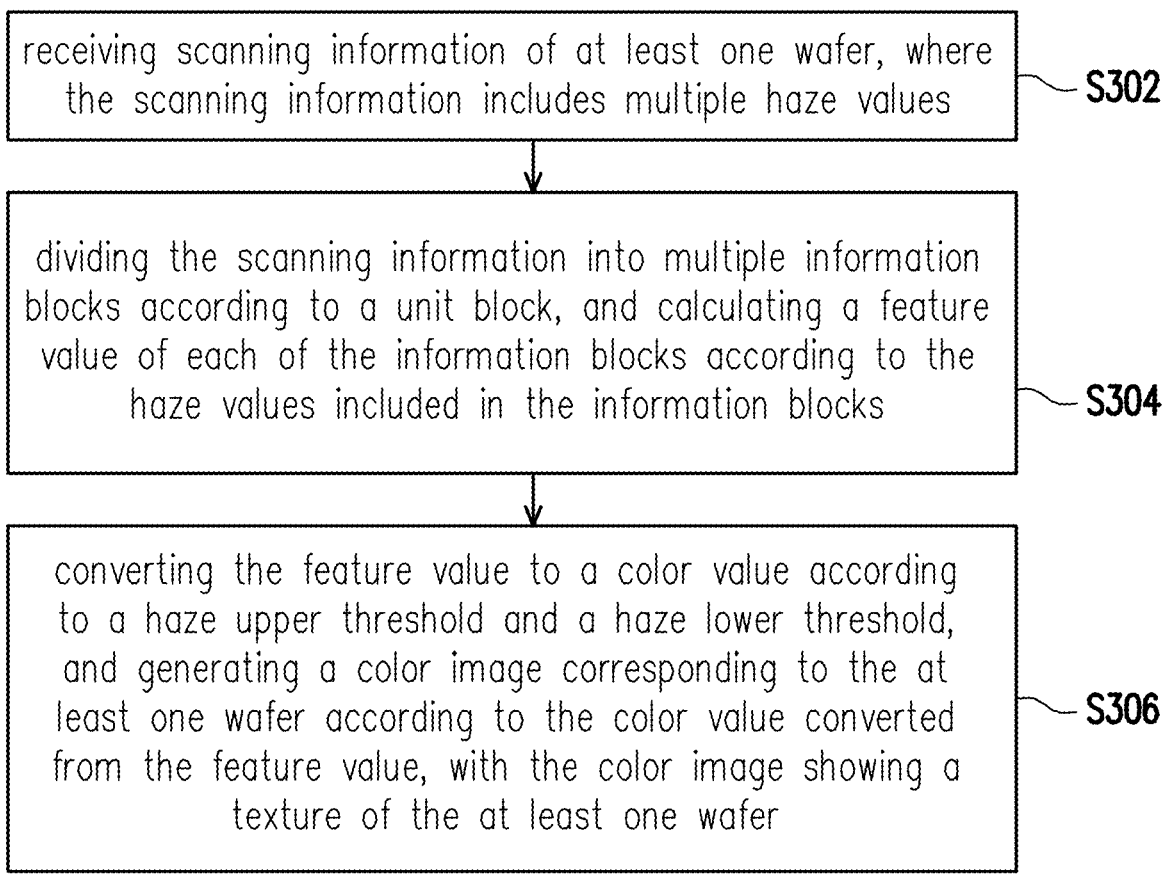
FIG. 3 is a flow chart of a wafer inspection method according to an embodiment of the disclosure.

FIG. 3 is a flow chart of a wafer inspection method according to an embodiment of the disclosure. With reference to FIG. 2 and FIG. 3 together, the method in this embodiment is applicable to the above wafer inspection apparatus 200. Detailed steps of the method in this embodiment are explained as follows with reference to description of devices of the wafer inspection apparatus 200 in FIG. 2 and FIG. 3.

It should be noted that each step in FIG. 3 may be implemented by multiple program codes or circuits, and the disclosure is not limited thereto. Furthermore, the method in FIG. 3 may be used with the following exemplary embodiments or may be used alone, and the disclosure is not limited thereto.

First, in step S302, the processor 230 receives scanning information of at least one wafer, and the scanning information includes multiple haze values. Specifically, the scanning information may be formatted as a pixel array, with each pixel in the pixel array representing a specific position of the corresponding wafer and including a haze value. The number of pixels in the array may be changed according to resolution capabilities of the scanning apparatus.

Next, in step S304, the processor 230 divides the scanning information into multiple information blocks according to a unit block and calculates a feature value of each of the information blocks according to the haze values included in each of the information blocks. Specifically, the processor 230 may group the pixels in the scanning information formatted as the pixel array into the information blocks according to the unit block. In different embodiments, the size and the setting method of the unit block may be set based on user needs, and the disclosure is not limited thereto. For example, the unit block may be an Nth order matrix or an M×N matrix, where M and N are integers greater than 0. For example, the processor 230 may use a 10×10 matrix as the unit block to group the pixel array into the information blocks. In other words, each of these information blocks includes 100 pixels. On the other hand, the processor 230 may set division area (such as 3 mm$^2$ or 4 mm$^2$) and calculate the number of pixels included in the unit block according to the wafer size (such as 8 inches or 12 inches) and the division area (i.e., the size of the unit block). It should be noted that regardless of the wafer size, the length, width, and area of each information block are the same.

In following, the processor 230 calculates a feature value of each information block according to the haze values included in the pixels in the information block. Here, the feature value may be a mean, a standard deviation, a coefficient of variation, or the like, but the disclosure is not limited thereto.

Figure 4:
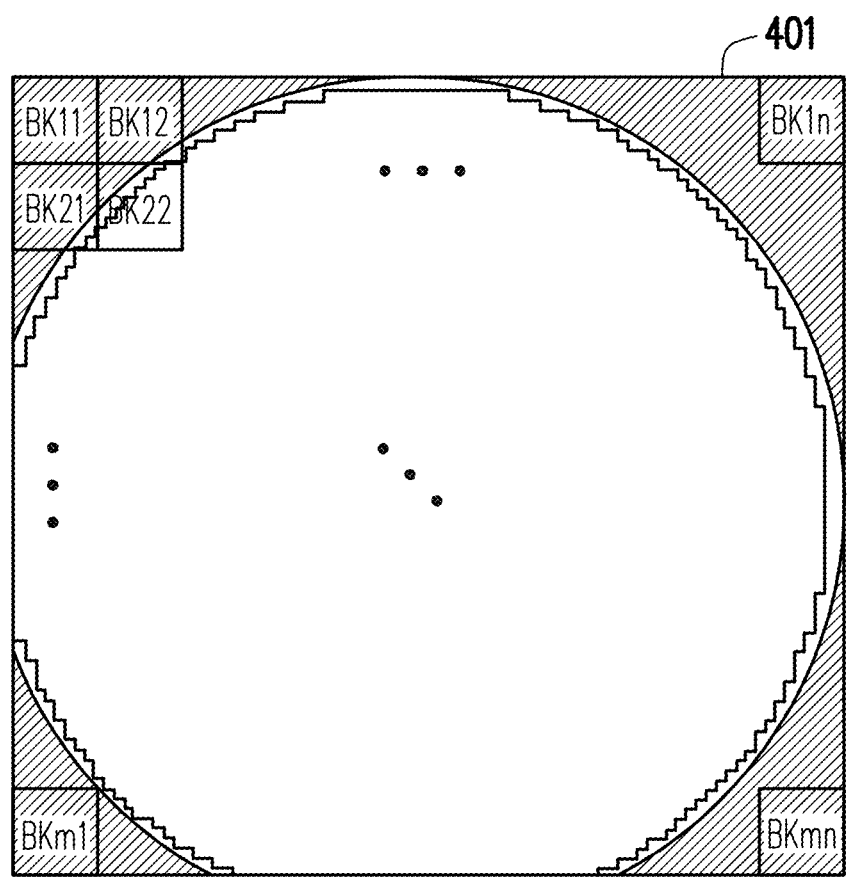
FIG. 4 is a schematic diagram of dividing information blocks according to an embodiment of the disclosure.

For example, FIG. 4 is a schematic diagram of dividing information blocks according to an embodiment of the disclosure. With reference to FIG. 4, which includes an image 401, the image 401 is a graphic schematic diagram of scanning information corresponding to a wafer. In this embodiment, assume that the processor 230 divides the scanning information into multiple information blocks BK11 to BKmn according to a unit block, and each of the information blocks BK11 to BKmn includes the same quantity of pixels. According to a haze value corresponding to each pixel included in the information block BK11, the processor 230 may calculate a mean of these haze values and use the calculated mean as the feature value of the information block BK11. In the same way, the processor 230 may calculate the feature value corresponding to each of the information blocks BK11 to BKmn. The processor 230 may store feature values as an array, where each element represents a specific information block and includes a feature value. However, the processor 230 may also use a table to store feature values, and the disclosure does not limit how the feature values are stored herein.

With reference to the flow chart in FIG. 3 again, in step S306, the processor 230 may convert the feature value to a color value according to a haze upper threshold and a haze lower threshold and generate a color image corresponding to the at least one wafer according to the color value converted from the feature value. The color image shows a texture of the at least one wafer.

Specifically, the processor 230 may set the haze upper threshold and the haze lower threshold and separate a value range between the haze upper threshold and the haze lower threshold equidistantly according to a set value to generate multiple sub-haze values. The set value may be set based on user needs, and the disclosure is not limited thereto. For example, the set value may be set to 0.01, 0.05, or other values. In following, the processor 230 sets each of the generated sub-haze values to correspond to a color value. In addition, the processor 230 may convert the feature value to a corresponding color value according to the sub-haze value that the feature value corresponds to. The color value is, for example but not limited to, a color parameter in a color space of YCbCr, RGB, YUV, CMYK, HSV, or other formats.

In addition, in a wafer processing process, process analysis may be performed on wafers from the same batch or on wafers from different batches. In a different embodiment, the disclosure may set the haze upper threshold and the haze lower threshold in different methods for different test modes. In this way, according to characteristics of different test modes in the wafer process analysis, the haze upper threshold and the haze lower threshold adapted for the test modes are set, such that scanning information of wafers may be converted to color images adapted for the test modes.

In an embodiment, in a single-wafer defect test mode, the processor 230 sets a maximum value of the feature value to the haze upper threshold and sets a minimum value of the feature value to the haze lower threshold. It should be noted that, during scanning of a wafer, since the haze value corresponding to a region outside the wafer (an oblique line region in the image 401 shown in FIG. 4) is 0, the feature value of an information block corresponding to the region outside the wafer (such as the information block BK11) is also calculated as 0. The processor 230 may exclude the information blocks whose feature values are 0 and set the minimum value of the feature value in the information block whose feature value is not 0 to the haze lower threshold.

In continuation from the embodiment in FIG. 4, for convenience of description, it is assumed herein that the feature value of the information block whose feature value is not 0 has a maximum value of 8.00 and a minimum value of 4.00 in the information blocks BK11 to BKmn. Herein, the processor 230 sets the haze upper threshold to 8.00 and sets the haze lower threshold to 4.00. Next, the processor 230 equidistantly separates a value range from 4.00 to 8.00 between the haze upper threshold and the haze lower threshold according to the set value to generate multiple sub-haze values. In detail, assuming that the set value of the embodiment is 0.01, the processor 230 may, with 0.01 as an interval, equidistantly separate the value range from 4.00 to 8.00 into sub-haze values at 4.00, 4.01, 4.02 . . . 7.98, 7.99, 8.00 and so on.

After the sub-haze values are separated, the processor 230 sets these sub-haze values to correspond to the color values respectively and converts the feature value of the information block to the corresponding color value. In this embodiment, the color value includes, for example, hue, saturation, and value in the HSV color space. Specifically, the processor 230 may set a sub-haze value of 8.00 close to the haze upper threshold to correspond to a hue angle of 0° (i.e., red), set a sub-haze value of 4.00 close to the haze lower threshold to correspond to a hue angle of 240° (i.e., blue), and also set other sub-haze values in the value range from 4.00 to 8.00 to equidistantly correspond to colors in a hue angle range from 0° to 240°. Afterward, according to the color values that the sub-haze values correspond to, the processor 230 converts the feature values of the information blocks BK11 to BKmn to the corresponding color values and reorganizes each information block to generate a color image corresponding to the wafer.

Figure 5:
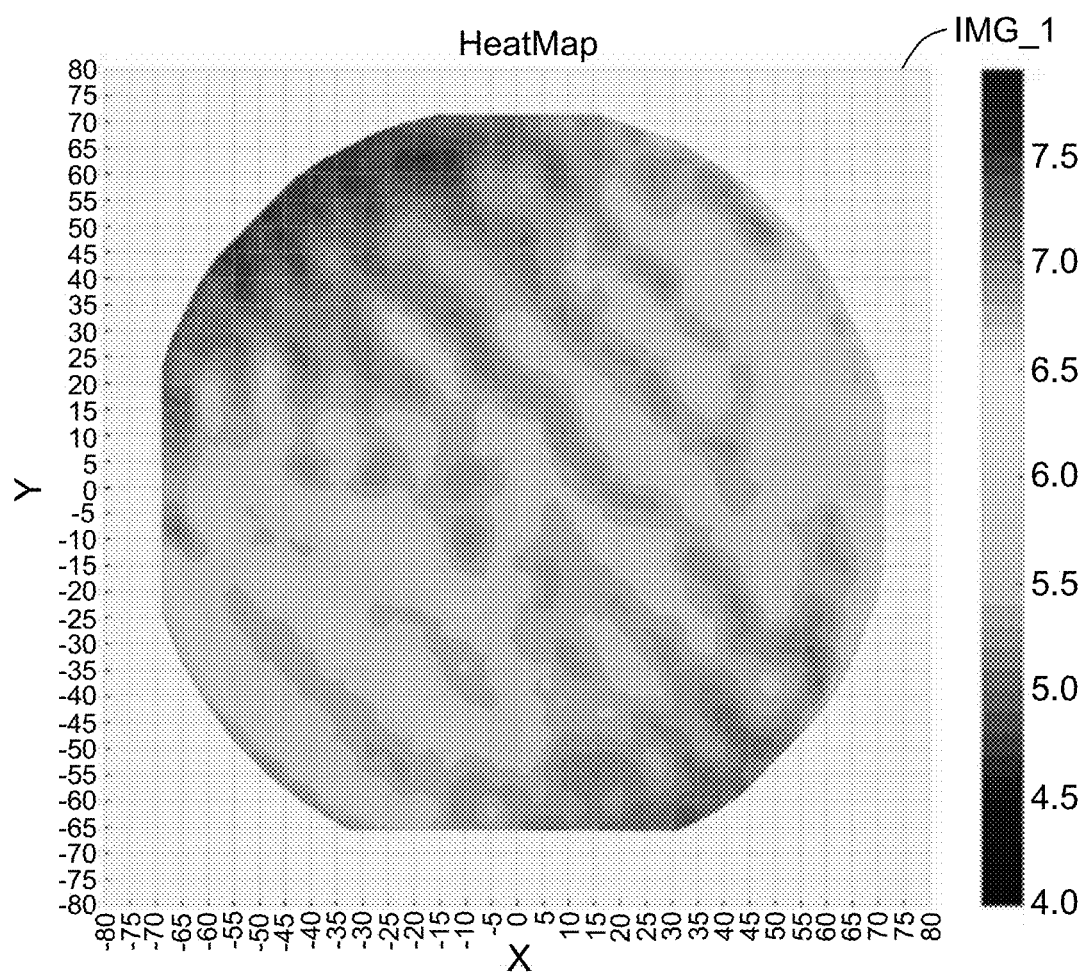
FIG. 5 to FIG. 6 are schematic diagrams of a color image of a wafer according to an embodiment of the disclosure.
Figure 6:
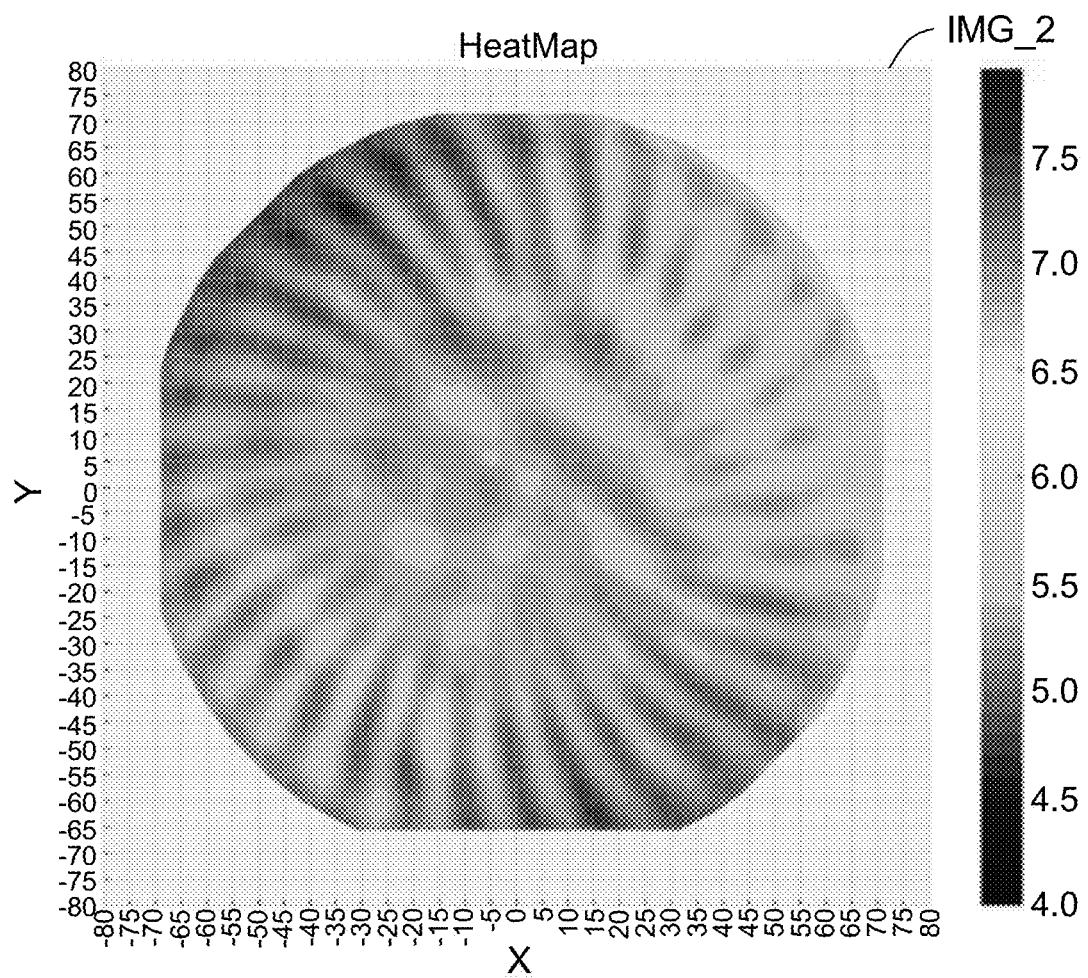

FIG. 5 to FIG. 6 are schematic diagrams of a color image of a wafer according to an embodiment of the disclosure. Through the above steps S302 to S306, the processor 230 may convert the scanning information into color images IMG_1 and IMG_2 in FIG. 5 and FIG. 6. In this way, the generated color images may display a texture of a wafer. For example, the color image IMG_1 shows that the wafer corresponding thereto has zebra-like patterns, while the color image IMG_2 shows that the wafer corresponding thereto has sun-like patterns. The converted color images may be further provided to a machine or a visual inspector for wafer defect determination as required.

As described in the above embodiment, setting the haze upper threshold and the haze lower threshold according to the maximum value and the minimum value of the feature values of each wafer may make the color image corresponding to each wafer have rich colors and facilitate determination of defect patterns of one single wafer. However, this method may cause the haze upper threshold and the haze lower threshold of each wafer to be different, which makes determination of pros and cons between different wafer processes relatively difficult. In light of this, the embodiments of the disclosure further provide another method of setting the haze upper threshold and the haze lower threshold.

In another embodiment, in the same batch process test mode and in the multi-batch process test mode, the processor 230 sets the haze upper threshold according to a default upper threshold and sets the haze lower threshold according to a default lower threshold. The same batch process test mode refers to analysis of processing performance between multiple wafers from the same ingot, while the multi-batch process test mode refers to analysis of processing performance between multiple wafers processed according to different process parameters.

For convenience of description, it is assumed that the default upper threshold is 8.00 and the default lower threshold is 4.00 in this embodiment. Herein, the processor 230 sets the haze upper threshold to 8.00 according to the default upper threshold and sets the haze lower threshold to 4.00 according to the default lower threshold. For specific description of converting the feature value to the color value according to the haze upper threshold and the haze lower threshold and generating the color image in this embodiment, reference may be made to the above embodiment, and the details thereof are not repeated here. However, it should be noted that since the haze upper threshold and the haze lower threshold in this embodiment are set according to default values, some of the feature values of the information blocks may exceed the haze upper threshold and the haze lower threshold. Herein, the processor 230 may mark the information blocks whose feature value is greater than the haze upper threshold and less than the haze lower threshold. Specifically, the processor 230 may convert the feature value greater than the haze upper threshold to a first independent color value (such as white) and convert the feature value less than the haze lower threshold to a second independent color value (such as black). The first independent color value and the second independent color value may be the same or different.

In other embodiments, the processor 230 may mark the information blocks whose feature value is not greater than haze upper threshold and is within a difference value from the haze upper threshold and mark the information blocks whose feature value is not less than the haze lower threshold and is within the difference value from the haze lower threshold. Specifically, the processor 230 may mark the feature value not greater than the haze upper threshold and not less than the haze lower threshold but close to the haze upper threshold and the haze lower threshold with a specific color parameter, but the disclosure does not limit the color parameter for marking.

For example, assuming that the haze upper threshold is 8.00 and the haze lower threshold is 4.00, the processor 230 may mark the feature value not greater than the haze upper threshold and within a first difference value from the haze upper threshold and mark the feature value not less than the haze lower threshold and within the first difference value from the haze lower threshold with lower saturation. In this embodiment, the first difference value is, for example, 20% of the difference value between the haze upper threshold and the haze lower threshold, which is 0.80. Here, the processor 230 may convert the information blocks whose feature values are within the range from 4.00 to 4.80 and within the range from 7.20 to 8.00 to color values with lower saturation.

In addition to converting the scanning information into the color image based on the above embodiment, in the embodiments of the disclosure, process performance analysis may further be performed according to various information recorded during conversion of the color image. For example, when marking the information blocks whose feature values are greater than the haze upper threshold and less than the haze lower threshold, the processor 230 may calculate a quantity of excess among the feature values in the wafer according to a quantity of marks. In addition, when marking the information blocks whose feature values are not greater than the haze upper threshold and within a difference value from the haze upper threshold distance and marking the information blocks whose feature values are not less than the haze upper threshold and within the difference value from the haze lower threshold distance, the processor 230 may further calculate a quantity of approximate excess among the feature values in the wafer according to a quantity of marks. In this way, the processor 230 may perform process analysis on the process to which the wafer belongs according to the quantity of excess and/or the quantity of approximate excess, determining process parameters according to an analysis result of the process analysis.

Figure 7:
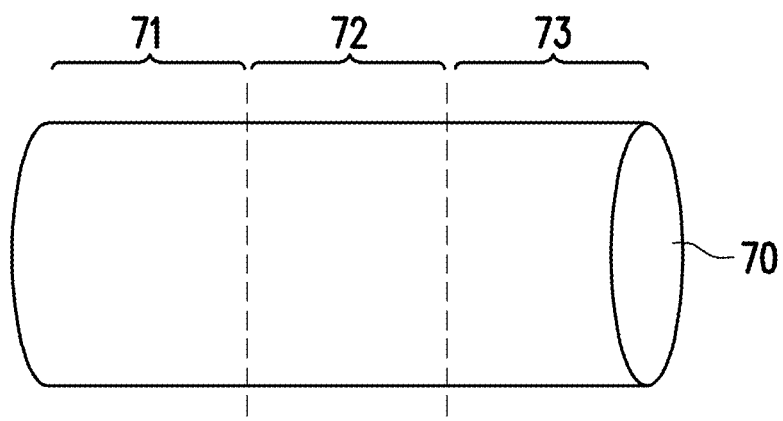
FIG. 7 is a schematic diagram of segmentation of a same batch wafer process according to an embodiment of the disclosure.

FIG. 7 is a schematic diagram of segmentation of a same batch wafer process according to an embodiment of the disclosure. With reference to FIG. 7, an ingot 70 may be segmented into three portions: a front portion 71, a middle portion 72, and a rear portion 73. If the current test mode of the wafer process is the same batch process test mode, the processor 230 may first set a quantity of wafers included in each portion. For example, recording is performed in each portion, with the front portion 71 including 3 wafers, the middle portion 72 including 4 wafers, and the rear portion 73 including 3 wafers. Next, the processor 230 may record a quantity of exceeding wafers whose quantity of excess is not 0 and a quantity of approximately exceeding wafers whose quantity of approximate excess is not zero in each portion, and may perform process analysis. For example, the quantity of wafers, the quantity of exceeding wafers, and the quantity of approximately exceeding wafers in each portion of this embodiment may be, for example, recorded as shown in Table 1 below.

TABLE 1

|  | front portion | middle portion | rear portion |
|---|---|---|---|
| quantity of wafers | 3 | 4 | 3 |
| quantity of exceeding wafers | 1 | 0 | 0 |
| quantity of approximately exceeding wafers | 2 | 1 | 0 |

With reference to Table 1 above, it may be seen that quality performance of the front portion 71 in the analysis result of the process analysis is relatively poor, and the processor 230 may send a notification to an inspector to notify the inspector to pay attention to the process parameters of the front portion 71.

On the other hand, if the current test mode of the wafer process is the multi-batch process test mode, the processor 230 may record a quantity of exceeding wafers and/or a quantity of approximately exceeding wafers in each batch, and may perform process analysis. If the analysis result of the process analysis shows that the quantity of exceeding wafers in a first batch is 3 and the quantity of exceeding wafers in a second batch is 1, the processor 230 may decide to use the process parameters of the second batch for subsequent wafer processing according to the analysis result.

In summary, the embodiments of the disclosure provide a wafer inspection method, which converts scanning information of a wafer into a color image, and the color image may reflect a texture of the wafer. During conversion of the color image in an embodiment of the disclosure, characteristics of a different test mode in wafer process analysis are taken into consideration in setting the haze upper threshold and the haze lower threshold adapted for the test mode, such that the scanning information of the wafer may be converted to the color image adapted for the test mode, which facilitates improvement for accuracy of subsequent wafer defect determination. In addition, in an embodiment, the wafer inspection method of the disclosure further marks and records the quantity of exceeding wafers and/or the quantity of approximately exceeding wafers for analysis of pros and cons between portions in the same batch of a process, or for comparison and analysis between different batches of a process. Accordingly, the wafer processing status may be inspected automatically, improving efficiency of wafer inspection.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A wafer inspection method, adapted for an electronic apparatus comprising a processor, the wafer inspection method comprising:
   receiving scanning information of at least one wafer, wherein the scanning information is formatted as a pixel array for forming an image, the pixel array comprising a plurality of pixels and a plurality of haze values;
   dividing the image into a plurality of information blocks according to a unit block;
   performing a calculation on the plurality of haze values included in each of the plurality of information blocks to obtain a statistical value, and setting the statistical value as a feature value of each of the plurality of information blocks;
   equidistantly separating a value range formed by a haze upper threshold and a haze lower threshold according to a set value to generate a plurality of sub-haze values for dividing the value range, and setting each of the sub-haze values to correspond to a color value, wherein in a same batch process test mode and a multi-batch process test mode, the haze upper threshold is set according to a default upper threshold, and the haze lower threshold is set according to a default lower threshold; and
   converting the feature value to a corresponding color value by finding one of the sub-haze values corresponding to the feature value of each of the plurality of blocks and extracting the color value corresponding to the found sub-haze value, and generating a color image corresponding to the at least one wafer according to the color value converted from the feature value, wherein the color image displays a texture of the at least one wafer.

2. The wafer inspection method according to claim 1, wherein the feature value comprises at least one of a mean, a standard deviation, and a coefficient of variation.

3. The wafer inspection method according to claim 1, further comprising:
   marking the plurality of information blocks of which the feature value is greater than the haze upper threshold and less than the haze lower threshold and calculating a quantity of excess of the feature value in the at least one wafer according to a quantity of marks; and
   marking the plurality of information blocks of which the feature value is not greater than the haze upper threshold and is within a difference value from the haze upper threshold and the plurality of information blocks of which the feature value is not less than the haze lower threshold and is within the difference value from the haze lower threshold, and calculating a quantity of approximate excess of the feature value in the at least one wafer according to the quantity of marks.

4. The wafer inspection method according to claim 3, further comprising:
   performing process analysis on a process to which the at least one wafer belongs according to the quantity of excess and the quantity of approximate excess, and determining a process parameter according to an analysis result of the process analysis.

5. A wafer inspection apparatus, comprising:

a connecting apparatus for connecting a scanning apparatus to receive scanning information of at least one wafer scanned and generated by the scanning apparatus, wherein the scanning information comprises a plurality of haze values;

a storage apparatus, storing one or a plurality of programming code snippets; and a processor, coupled to the connecting apparatus and the storage apparatus and configured to execute the one or the plurality of programming code snippets to:

receive the scanning information, wherein the scanning information is formatted as a pixel array for forming an image, the pixel array comprising a plurality of pixels and a plurality of haze values;

divide the image into a plurality of information blocks according to a unit block;

perform a calculation on the plurality of haze values included in each of the plurality of information blocks to obtain a statistical value, and set the statistical value as a feature value of each of the plurality of information blocks;

equidistantly separate a value range formed by a haze upper threshold and a haze lower threshold according to a set value to generate a plurality of sub-haze values for dividing the value range, and set each of the sub-haze values to correspond to a color value, wherein in a same batch process test mode and a multi-batch process test mode, the processor is configured to set the haze upper threshold according to a default upper threshold and set the haze lower threshold according to a default lower threshold; and convert the feature value to a corresponding color value by finding one of the sub-haze values corresponding to the feature value of each of the plurality of blocks and extracting the color value corresponding to the found sub-haze value, and generate a color image corresponding to the at least one wafer according to the color value converted from the feature value, wherein the color image displays a texture of the at least one wafer.

6. The wafer inspection apparatus according to claim 5, wherein the feature value comprises at least one of a mean, a standard deviation, and a coefficient of variation.

7. The wafer inspection apparatus according to claim 5, wherein the processor is further configured to:

mark the plurality of information blocks of which the feature value is greater than the haze upper threshold and less than the haze lower threshold and calculate a quantity of excess of the feature value in the at least one wafer according to a quantity of marks; and mark the plurality of information blocks of which the feature value is not greater than the haze upper threshold and is within a difference value from the haze upper threshold and the plurality of information blocks of which the feature value is not less than the haze lower threshold and is within the difference value from the haze lower threshold, and calculate a quantity of approximate excess of the feature value in the at least one wafer according to the quantity of marks.

8. The wafer inspection apparatus according to claim 7, wherein the processor is further configured to:

perform process analysis on a process to which the at least one wafer belongs according to the quantity of excess and the quantity of approximate excess, and determining a process parameter according to an analysis result of the process analysis.

* * * * *